United States Patent
Meyer (10) Patent No.: US 10,705,611 B2
(45) Date of Patent: Jul. 7, 2020

(54) INTERFACES AND METHODS OF DIGITAL COMPOSITION AND EDITING OF TEXTURES FOR RENDERING ON TACTILE SURFACES

(71) Applicant: Northwestern University, Evanston, IL (US)

(72) Inventor: David J. Meyer, Chicago, IL (US)

(73) Assignee: NORTHWESTERN UNIVERSITY, Evanston, IL (US)

(*) Notice: Subject to any disclaimer, the term of this patent is extended or adjusted under 35 U.S.C. 154(b) by 298 days.

(21) Appl. No.: 15/514,271

(22) PCT Filed: Sep. 25, 2015

(86) PCT No.: PCT/US2015/052275
§ 371 (c)(1),
(2) Date: Mar. 24, 2017

(87) PCT Pub. No.: WO2016/053789
PCT Pub. Date: Apr. 7, 2016

(65) Prior Publication Data
US 2017/0249014 A1    Aug. 31, 2017

Related U.S. Application Data

(60) Provisional application No. 62/058,441, filed on Oct. 1, 2014.

(51) Int. Cl.
*G06F 3/01* (2006.01)
*G06F 3/0488* (2013.01)
*G06F 3/0484* (2013.01)
*G06F 3/16* (2006.01)
*G06F 3/045* (2006.01)
(Continued)

(52) U.S. Cl.
CPC ............ *G06F 3/016* (2013.01); *G06F 3/0488* (2013.01); *G06F 3/04847* (2013.01);
(Continued)

(58) Field of Classification Search
CPC ........ G06F 3/041; G06F 2203/14; G06F 3/01; G06F 3/02; G06F 3/03; G06F 3/11;
(Continued)

(56) References Cited

U.S. PATENT DOCUMENTS

| | | | |
|---|---|---|---|
| 5,999,190 A | 7/1999 | Sheasby et al. | |
| 6,856,259 B1 * | 2/2005 | Sharp | G06F 3/0488 178/18.01 |

(Continued)

FOREIGN PATENT DOCUMENTS

EP      2674835      12/2013

OTHER PUBLICATIONS

PCT International Preliminary Report on Patentability dated Apr. 4, 2017; filed in International Application No. PCT/US2015/052275; 9 pgs.

(Continued)

*Primary Examiner* — Quoc A Tran
(74) *Attorney, Agent, or Firm* — Vedder Price P.C.

(57) ABSTRACT

This disclosure provides designer interfaces that present condensed representations of texture functions, the representations displaying selected control points that manipulate the representations, an algorithm that computes a texture function based on the positions of said selected control points, and the texture function generating a signal to control a force on an appendage of a user that touches a tactile surface, and methods of using the designer interfaces.

11 Claims, 10 Drawing Sheets

(51) Int. Cl.
*G06F 3/041* (2006.01)
*G08B 6/00* (2006.01)
*G06F 17/00* (2019.01)

(52) U.S. Cl.
CPC .............. *G06F 3/017* (2013.01); *G06F 3/045* (2013.01); *G06F 3/0414* (2013.01); *G06F 3/16* (2013.01); *G06F 2203/014* (2013.01); *G08B 6/00* (2013.01)

(58) Field of Classification Search
CPC ..... G06F 3/16; G06F 3/17; G06F 3/18; G06F 3/016; G06F 3/017; G06F 3/045; G06F 3/0414; G08B 6/00; G06T 19/006
See application file for complete search history.

(56) References Cited

U.S. PATENT DOCUMENTS

| | | | |
|---|---|---|---|
| 8,405,618 B2 * | 3/2013 | Colgate | G06F 3/016 345/173 |
| 2005/0031225 A1 | 2/2005 | Setters et al. | |
| 2007/0268248 A1 | 11/2007 | Ziles et al. | |
| 2008/0062143 A1 * | 3/2008 | Shahoian | G06F 1/1616 345/173 |
| 2009/0128503 A1 | 5/2009 | Grant et al. | |
| 2009/0250267 A1 | 10/2009 | Heubel et al. | |
| 2010/0044121 A1 * | 2/2010 | Simon | G06F 3/03547 178/18.03 |
| 2011/0063993 A1 * | 3/2011 | Wilson | G06F 3/044 370/254 |
| 2012/0229407 A1 | 9/2012 | Harris et al. | |
| 2012/0327006 A1 * | 12/2012 | Israr | G06F 3/016 345/173 |
| 2014/0139450 A1 * | 5/2014 | Levesque | G06F 3/016 345/173 |

OTHER PUBLICATIONS

European Search Report dated Apr. 13, 2018 issued in connection with European Application No. 15846785.2; 9 pages.

* cited by examiner

INTERFACES AND METHODS OF DIGITAL COMPOSITION AND EDITING OF TEXTURES FOR RENDERING ON TACTILE SURFACES

CROSS-REFERENCE TO RELATED APPLICATION

This application claims the benefit and priority of U.S. Provisional Patent Application Ser. No. 62/058,441, filed Oct. 1, 2014, the disclosure of which is hereby incorporated herein by reference in its entirety.

CONTRACTUAL ORIGIN OF THE INVENTION

This invention was made with government support under IIS0964075 awarded by the National Science Foundation. The government has certain rights in the invention.

BACKGROUND

Field of the Invention

The present invention generally relates to digitally representing virtual textures for texture effects on devices having a tactile surface, and more particularly to computational methods and graphical user interfaces that provide unique tools for texture composition and editing.

Discussion of the Prior Art

Touch interfaces are quickly becoming the most common user interface to computers and digital devices as the technology to detect multiple fingers and display virtual images becomes more seamless. Alongside "traditional" touch panel technology, haptic touch panel technology also is being developed, some examples of which use methods of modulating surface friction. Recent developments in the field demonstrate the capability to programmatically alter surface friction properties of a touch screen.

These tactile touch screens have the ability to render virtual textures by achieving high frequency changes in surface friction as fingertips slide across the surface. Few, if any, of these demonstrations have succeeded in creating realistic or meaningful sensations beyond a "buzzing" or slipperiness.

Works within the prior art of rendering textures on a touch surface fall into two main categories: those that measure real textures and attempt to recreate them virtually, and those which attempt to assign dimensionality to real textures. However, the existing tools to represent and render texture are lacking, and do not provide convenient methods for representation and editing.

SUMMARY

Described herein are novel design interfaces and a novel set of methods for use in digitally representing, designing and editing virtual textures that provide numerous advantages over the prior art. The purpose and advantages of the invention will be set forth in and apparent from the description and drawings that follow, as well as will be learned by practice of the claimed subject matter.

The design interfaces and methods disclosed herein present effective tools that allow a designer of tactile effects to have greater freedom in designing and implementing textures, to develop strong mental models, so that the designer knows how to use the tools to obtain desired results. They also allow a designer to work quickly and efficiently, so that new ideas can be readily conceived, implemented, tested and revised. The present disclosure provides novel methods for digitally representing textures and unique tools for texture composition and editing that provide numerous advantages over the prior art laborious method of recording and playback, and hand-coding.

The tools illustrated herein differ in that they are focused on the representation, creation, and modification of digitally rendered virtual tactile textures. The teachings enhance the ability of designers of user interfaces to create textures that are perceptually different and carry different meanings. The composition methods taught herein are not purely physically motivated, but are intended to span the entire space of possible texture functions, regardless of the "realness" of the texture. Additionally, the novel composition tools allow for immediate feedback of how the user has changed the texture. Compile and computation times may be less than 200 ms, allowing the designer to quickly iterate over prior designs.

In a first aspect, the disclosure presents methods for composing texture functions that include providing a designer interface with condensed representations of texture functions on an interface touch screen, selecting control points on the interface touch screen that manipulate said representations, implementing an algorithm that computes a texture function based on the positions of the control points on the interface touch screen, and rendering to a tactile surface a force defined by the computed texture function.

In a second aspect, the disclosure presents designer interfaces including a graphical user interface that that presents condensed representations of texture functions, said representations displaying selected control points that manipulate said representations, an algorithm that computes a texture function based on the positions of said selected control points, and said texture function associated with generating a signal to control a force on an appendage that touches a tactile surface.

BRIEF DESCRIPTION OF THE DRAWINGS

In describing the preferred embodiments, reference is made to the accompanying drawing figures wherein like parts have like reference numerals, and wherein.

It should be understood that the drawings are not to scale. While some details of graphical interfaces have not been included, such details are considered well within the comprehension of those of skill in the art in light of the present disclosure. It also should be understood that the present invention is not limited to the example embodiments illustrated.

Glossary

The following terms have the following meanings within the present disclose:

compose—to design and create a texture function;

control point—a user-changeable point on a composing interface that uses graphical representations to define a portion of a mathematical function;

tactile surface—a touch surface on a device which achieves variable lateral force that may be applied to an appendage, such as a bare finger that is in contact with the surface;

texture function—a mathematical function that uses inputs such as finger position and its derivatives, time, and other finger and internal state variables and computes a lateral force to be applied to the finger;

to render a texture—to achieve the lateral force on a tactile surface commanded by a texture function; and state variable—position, velocity, acceleration, or other derivatives of fingertip contact with the tactile surface.

DETAILED DESCRIPTION

Referring to FIGS. 1A-11, it will be appreciated that graphical interfaces and methods for use in digitally representing, designing and editing virtual textures on tactile surfaces of the present disclosure generally may be embodied within numerous configurations.

Figure 1A:
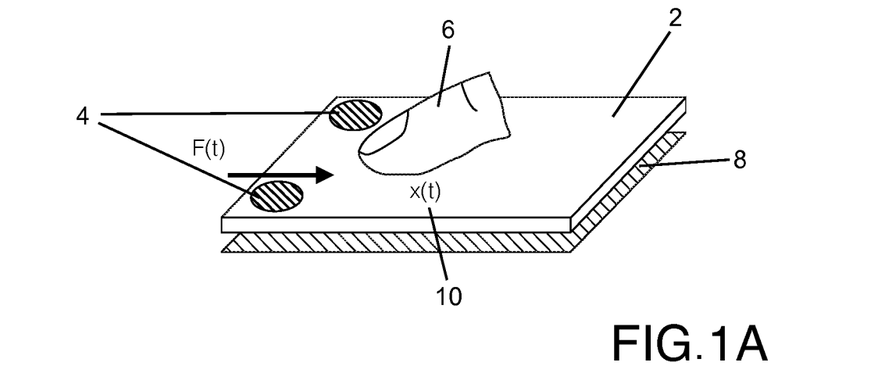
FIG. 1A depicts a tactile surface with at least one actuator capable of achieving a lateral force on a bare finger touching the surface and using at least one sensor capable of measuring finger position.
Figure 1B:
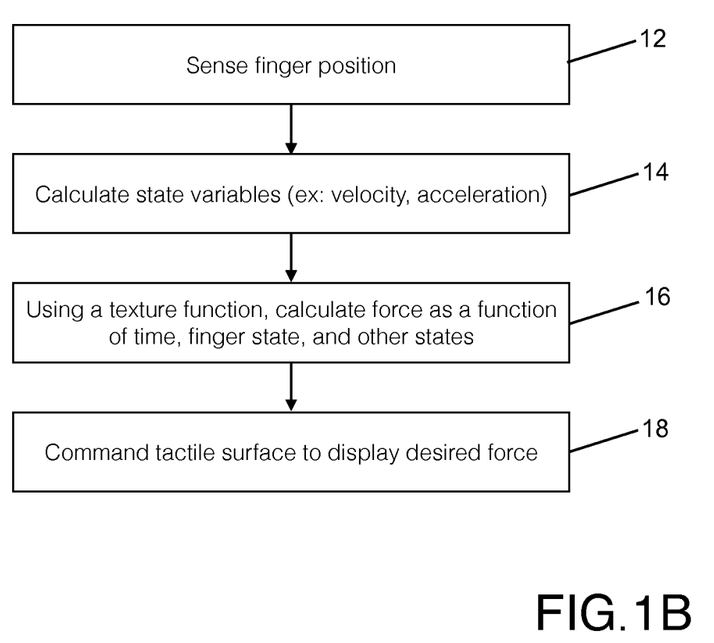
FIG. 1B is a flow diagram illustrating how the tactile surface of FIG. 1A renders texture on a finger in contact with the surface.

Haptic technology renders virtual textures by achieving force modulation on a fingertip scanning or sliding across a tactile surface. One such example is shown in FIG. 1A, in the form of a tactile surface 2 with at least one actuator 4 that controls surface friction, while the finger 6 is tracked by at least one sensor 8 that is capable of measuring finger position, such as at a touch point 10. The method of rendering the virtual textures is represented in FIG. 1B in a flow diagram that shows in general how the tactile surface 2 of FIG. 1A renders texture on a finger 6 in contact with the tactile surface 2. The method includes a first step 12 sensing the finger position, a second step 14 of calculating state variables, such as the velocity and acceleration of the finger, third step 16 of using a texture function to calculate force as a function of time, finger state and other internal states, and then a fourth step 18 of commanding a tactile surface to display or render the desired force to the finger. The texture function may also depend on internal computational states, such as the position of virtual objects. The texture function may also dictate different textures for different parts of the screen.

Figure 2A:
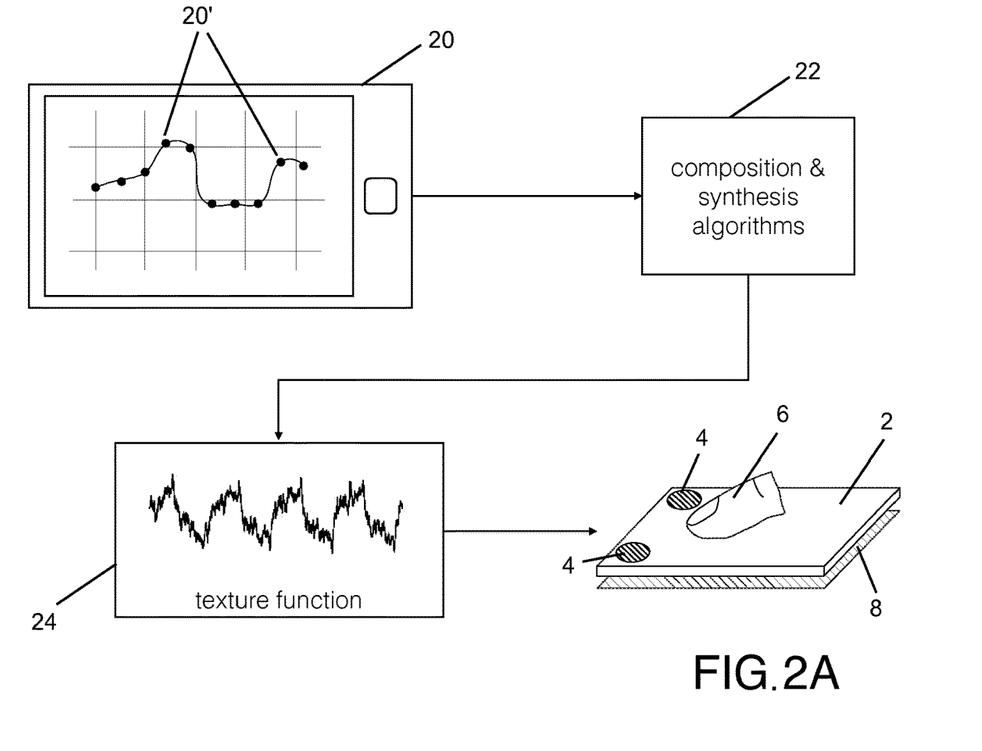
FIG. 2A depicts one example embodiment of a texture composition tool with a graphical interface for user input, computer algorithms for creating texture functions, and a tactile surface for rendering the resulting texture functions.
Figure 2B:
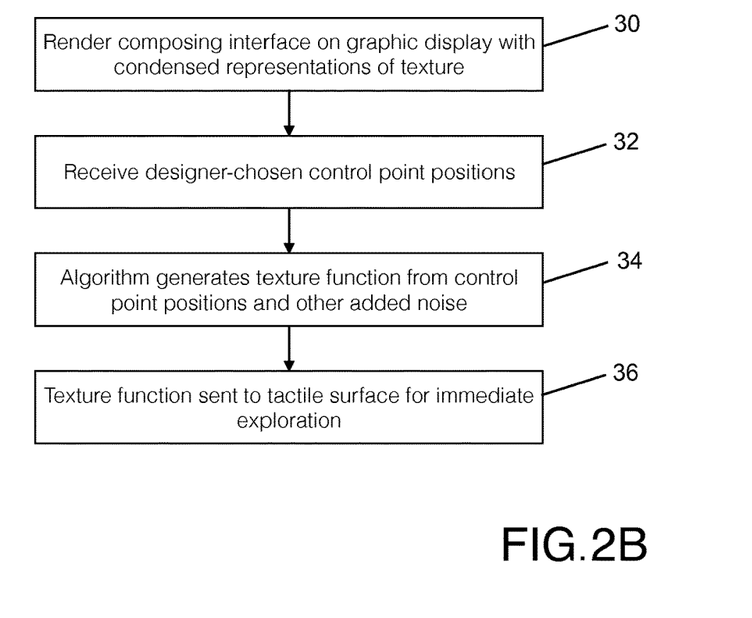
FIG. 2B is a flow diagram illustrating the steps to implement and use an example texture composition tool.
Figure 3:
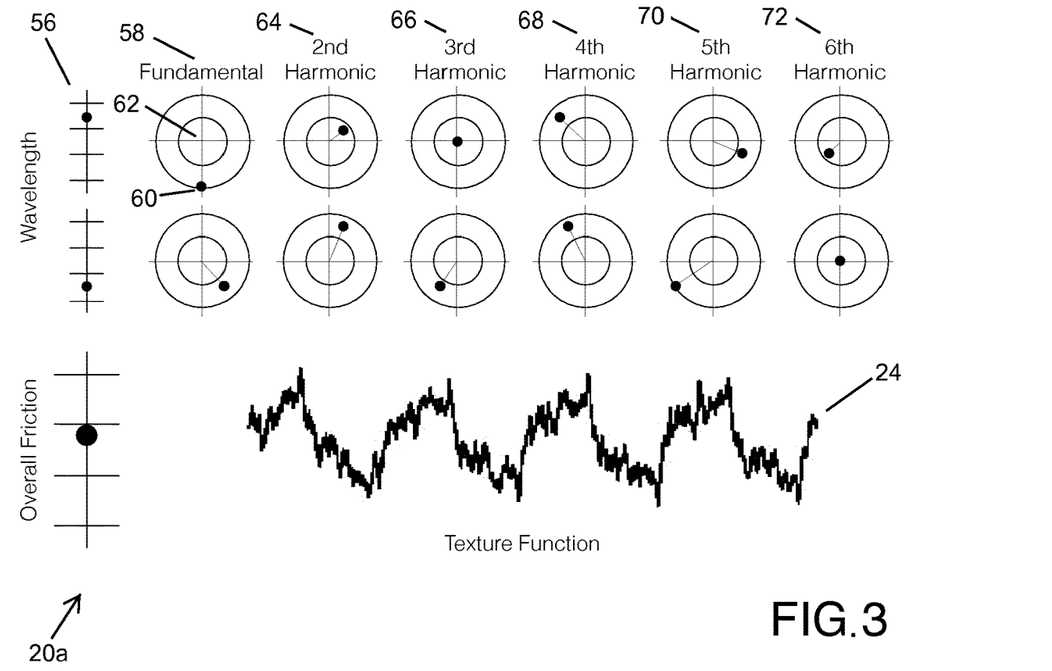
FIG. 3 is an example embodiment of a composing interface usable in performing an additive composition method, in which the texture function is represented as a series of fundamental spatial periodic waves and their harmonics.
Figure 4:
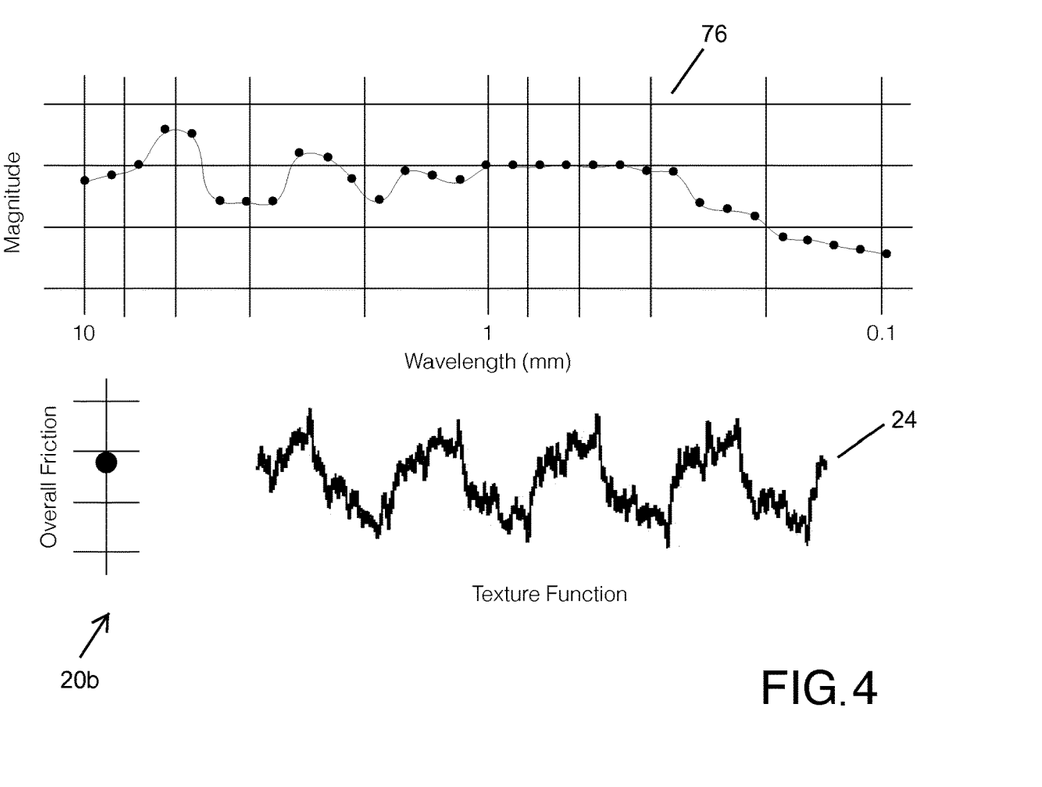
FIG. 4 is an example embodiment of a composing interface usable in performing a subtractive composition method, in which the texture function is represented as a spatial frequency power spectrum.

Turning to FIG. 2A, an example embodiment of a texture composition tool with a graphical interface 20 showing control points 20' for user input is depicted. The composition tool links the graphical interface 20 to computer algorithms 22 for creating texture functions 24, and to a tactile surface 2 for rendering the resulting texture functions 24 to a user's finger or other appendage 6. The steps of a method to use such an example texture composition tool are shown in a flow diagram in FIG. 2B. For instance, in a first step 30 the composition tool first renders a composing interface 20 on a graphic display with condensed representations of texture, such as are shown in FIG. 3 or 4, as described further herein. In the next step 32, the composition tool receives designer-chosen control point 20' positions that are intended to generate textures. In the next step 34, the system algorithm generates a texture function 24 from the control point 20' positions and other added signal noise. Then, in a further step 36, the texture function 24 then is sent to a tactile surface 2 for immediate exploration by the designer. This permits quick, iterative use of the interface 20 by the designer by altering the control point 20' positions and promptly experiencing the net textural results.

Figure 2C:
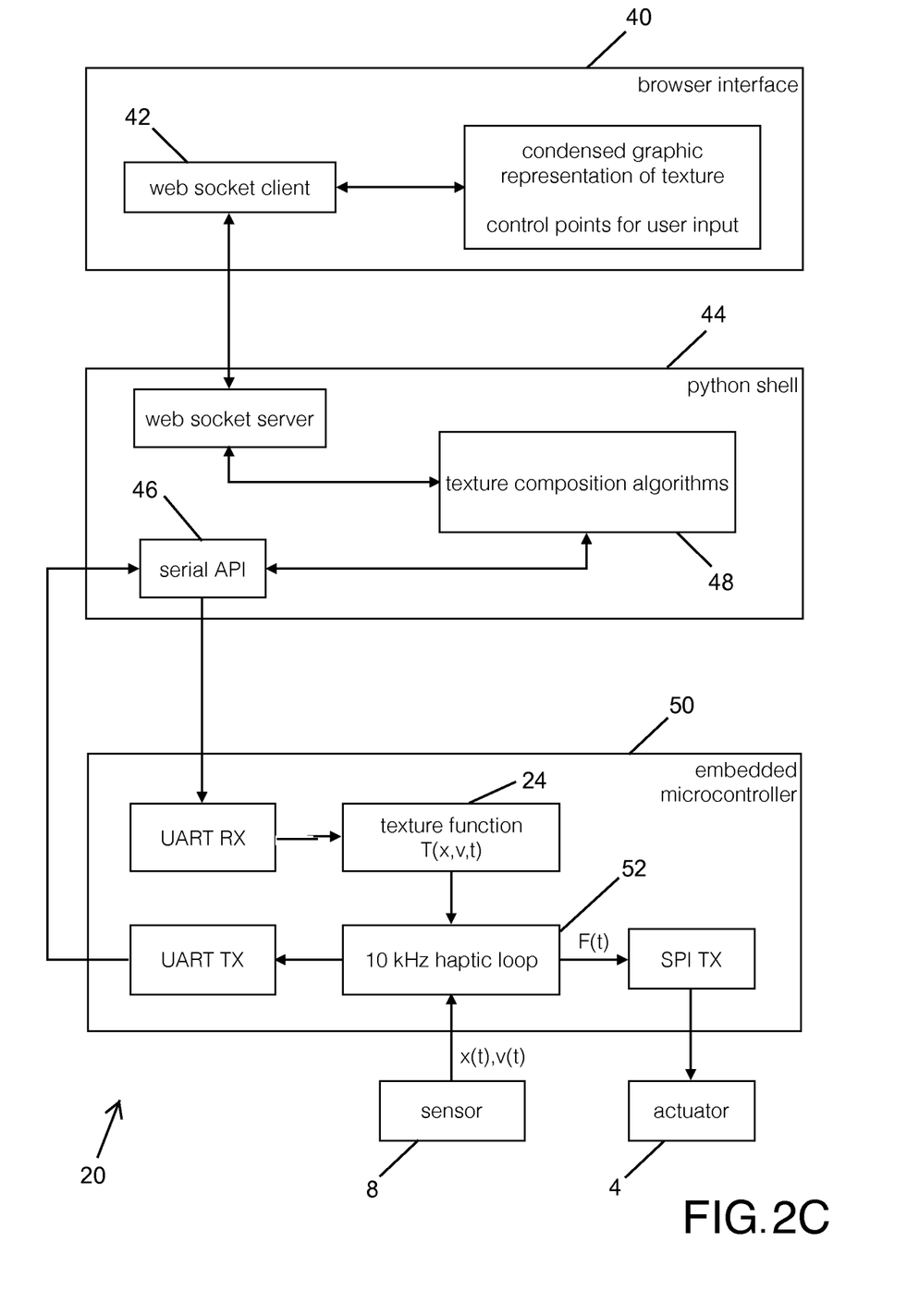
FIG. 2C is a block diagram illustrating a software and firmware implementation of an example texture composition tool.

Turning to FIG. 2C, an example software and firmware implementation of a texture composition tool is shown. In the example embodiment, the composing interface 20 is implemented in a web browser 40, communicating with the composition tool via a WebSocket protocol 42, wirelessly or wired. In this example, the composition tool is implemented in the programming language Python, represented by python shell 44, using a serial Application Program Interface (API) 46 to communicate with the embedded controller on the tactile device. The composition tool algorithms 48 take input from the browser interface over the WebSocket protocol 42 and calculated texture functions to send over the serial protocol to the device controller. In the example embodiment, an embedded controller 50 runs the haptic loop 52 at 10 kHz to update the actuator force from the actuator 4 based on input from the sensor 8 and texture function 24.

With respect to graphical interfaces 20, FIG. 3 shows an example embodiment of a composing interface 20a usable in performing an additive composition method, in which the texture function 24 is represented as a series of fundamental spatial periodic waves and their harmonics. The fundamental wavelength to be applied to the tactile surface 2 is edited by use of a slider 56 on the left side of the computer interface. The slider 56 may be manipulated in a touch screen environment. The magnitude and phase of the fundamental wavelength are controlled by the position of a control point that is chosen by the designer and applied in the first graph 58 to the right of the wavelength slider. The magnitude is calculated by the distance from the control point 60 to the center 62 of the graph, and the phase is calculated by the angle of a line from the control point 60 to the center 62 of the graph 58. The subsequent graphs of harmonics (2*fundamental or $2^{nd}$ harmonic 64, 3*fundamental or $3^{rd}$ harmonic 66, 4*fundamental or $4^{th}$ harmonic 68, 5*fundamental or $5^{th}$ harmonic 70, 6*fundamental or $6^{th}$ harmonic 72, . . . etc.) are set by controls that may be displayed by similar graphs. Any number of additional fundamental periodic waves may be added, and other attributes may be represented on a single editable graphical interface, such as wavelength. All the waveforms are added to create a spatial-domain texture function 24, to which a DC offset is added to display or render on a tactile surface 2. The periodic waves and harmonics may exist in a spatial domain, a temporal domain or on a real imaginary plane. In a preferred embodiment, the spatial domain texture function 24 is calculated using equation 1, where $R_k$ and $\varphi_k$ are the distance and angle of the lines to the control points for each harmonic where k represents the integer of the harmonic. The DC force is represented by the term DC. The different fundamentals are denoted by the character i. Any number of fundamentals and their harmonics may be included, giving rise to unlimited combinations of i and k.

$$T(x) = \sum_{i=1}^{2} \sum_{k=1}^{6} R_k \sin\left(\frac{2\pi xk}{\lambda} + \phi_k\right) + DC \qquad (1)$$

From this spatial domain texture function 24, the output actuator force F(t) is computed by taking as input the finger position 10 as sensed by a sensor 8, for instance in the context of the device depicted in FIG. 1A. Therefore, the force F(t) commanded to the finger 6 is given in equation 2.

$$F(t)=T(x(t)) \qquad (2)$$

In the preferred embodiment, these waves are sinusoidal functions of one or more spatial coordinates, such as the x and y coordinates of a respective touch location 10. It should be appreciated that other functional forms (e.g., square or triangle waves) can be used instead of sinusoids, and that the waves also may be functions of other variables, such as time.

In the preferred embodiment, a designer composes a desired texture that a user would feel on a finger 6 that is touching the tactile surface 2 by adding in new fundamental periodic waves and their respective harmonics by sliding the control points on their respective graphs, 58, 64, 66, 68, 70, 72, etc.

The main benefit of the additive composition tool or composing interface 20a is the capability to create signals associated with virtual presentations on graphs and to be able to perceive their resulting texture quickly. Without this tool, waveforms must be hand-coded, which takes significant time and effort, limiting the ability to use an iterative process to arrive at a final design. Iterative design is crucial to the creative process, and this tool enables users to practice and learn from their past creations to form mental models of virtual textures.

Turning to FIG. 4, another example embodiment of a graphical interface in the form of a composing interface 20b is shown. This composing interface 20b is usable in performing a subtractive composition method, in which the texture function 24 is represented as a spatial frequency power spectrum 76.

The subtractive composition method begins with a noise function. In a preferred embodiment, the waveform of a noise is a function of two spatial coordinates where a user is touching a touch surface, but it may also be a function of other variables, such as time. An arbitrary filter, for example a low-pass, band-pass, or other is chosen by the designer to filter the noise in space and time. In a preferred embodiment, the filter is designed by moving or drawing a set of control points on a frequency spectrum 76. Control points, shown as dots on the curve in FIG. 4, move vertically to set the attenuation at a range of frequencies. In the preferred embodiment, these control points are located at frequencies that are logarithmically spaced in the frequency range of interest for virtual texture. The control points are initialized at wavelengths given by equation 3, for i=[−15,15] representing the wavelengths between 0.1 mm and 10 mm.

$$\lambda_i = 10^{\left(\frac{i}{15}\right)} \qquad (3)$$

The designer sets the magnitude of the filter at these control wavelengths by dragging or drawing them in place. The final filter contains half of the discrete Fourier transform space of the tactile surface workspace. The wavelengths at which the final filter exists are given by equation 4, where r is the resolution of the finger position sensor 8, k=[1, L/2r], and L is the length of the finger position sensor 8.

$$\lambda_k = 2rk \qquad (4)$$

In the preferred embodiment, the filter is set to zero outside the frequency range of interest, which is bounded by the $\lambda_i$ terms that dictate the horizontal position of the axis. The $\lambda_k$ terms between the control points are interpolated by a piecewise cubic hermite spline function, thus completing the entire filter calculation. The final filter is given by the function in equation 5, where pchip( ) represents the piecewise cubic hermite interpolation function.

$$G(k)=0 \text{ if } \lambda_k \text{ outside } \lambda_i \qquad (5)$$

$$G(k)=p\text{chip}(\lambda_i) \text{ if } \lambda_k \text{ inside } \lambda_i$$

In the preferred embodiment of this further example interface, the finished interpolated filter is multiplied by a noise function to create a noisy frequency spectrum with frequency components that are proportional in magnitude to the designed curve that is associated with the selected control points. The noisy frequency spectrum is given by equation 6.

$$F(k)=(\text{rand}(0,1)e^{-irand(0,2\pi)})G(k) \qquad (6)$$

The noisy frequency spectrum is passed through an inverse discrete Fourier transform to obtain the input signal for generating the spatial-domain texture that would be experienced by the user's finger 6. This spatial-domain texture is added to a prescribed input for a DC offset and rendered on a tactile surface 2, as described previously with equation 2.

Other possible embodiments include those that perform calculations and implement the filter in other domains, such as the temporal domain, in which case the filter is convolved with a temporal white noise signal. Additionally, designed filters may be combined with each other or other effects by addition or subtraction. Control points may be placed linearly or logarithmically spaced at any resolution, or may be spaced irregularly as chosen by the designer. Other interpolation algorithms, such as spline or polynomial also may be used. Additionally, control points may have variable-width tangent curves, such that they create sharper or broader spikes in the frequency domain. This can be implemented by calculating minimum spline radii, or by using bezier-curve interpolation. The noise function also maybe gaussian noise, 1/f noise or other noise signals, as well as waveforms or signals based on measured textures or other composed textures.

The main benefit of this method of subtractive composition is the ease of designing complex textures. The randomization also allows for creation of more realistic texture signals without the need for exact specification of the texture function.

Figure 5:
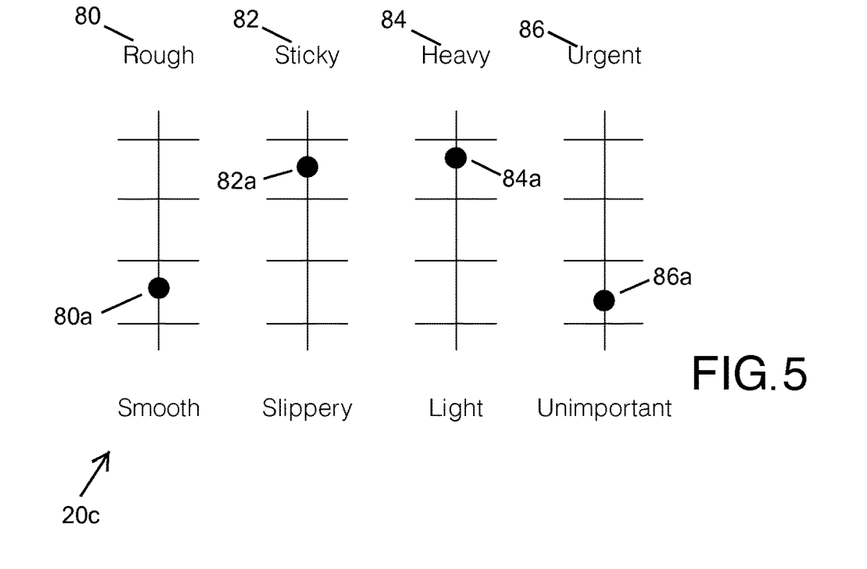
FIG. 5 is an example embodiment of affective composition, in which the texture function is represented as a set of affective adjective pairs.

The new designer interfaces also enable use of an advantageous affective composition. Affective composition uses pre-defined principal components to create a texture that evokes emotions described by the principal components themselves. For instance, in another preferred example embodiment of a graphical interface in the form of a designer interface 20c that is shown in FIG. 5, affective adjective pairs 80, 82, 84, 86 are displayed with a sliding control point 80a, 82a, 84a, 86a between them. The position of the control point indicates the relative strength of each adjective; when a point 80a is closer to one word (e.g., rough) rather than the other (e.g., smooth), then a composition algorithm computes a texture function 24 that is indicative of this relative strength or balance between the two (e.g., yielding a more rough texture). The sliding control point may be shown on a touch screen designer interface 20c and may be quickly and easily manipulated by the designer.

In the example embodiment, the texture composition algorithm modifies a range of spatial frequencies between 4 mm and 0.4 mm in wavelength as governed by equation 7, where R is the position of the "Roughness" slider from 0-1, 0 being the softest, 1 being the roughest.

$$E(k) = 10R \text{ for } 0.4 \text{ mm} < \lambda_k < 4 \text{ mm}$$

$$E(k) = 10(1-R) \text{ for } \lambda_k < 0.4 \text{ mm}$$

$$E(k) = 1 \text{ otherwise} \quad (7)$$

As the slider 80 is moved toward "rough", the algorithm boosts the texture function at frequencies between 0.4 and 4 mm wavelength, by increasing the magnitude of the effect, E(k) at those frequencies. As the slider 80 is moved toward "smooth", those frequencies are attenuated and higher frequencies with wavelengths smaller than 0.4 mm are boosted. The resulting filter, E(k) is algorithmically designed to match user experience.

To design the filter, E(k), a set of physical textures that span the space of perception can be evaluated for their affective consequences using any of a number of known psychometric testing techniques. Using multidimensional scaling techniques, principal component analysis, and/or linear regression, the affective responses are fit to a series of filters that are linearly combined via the composing interface in FIG. 5.

Figure 7:
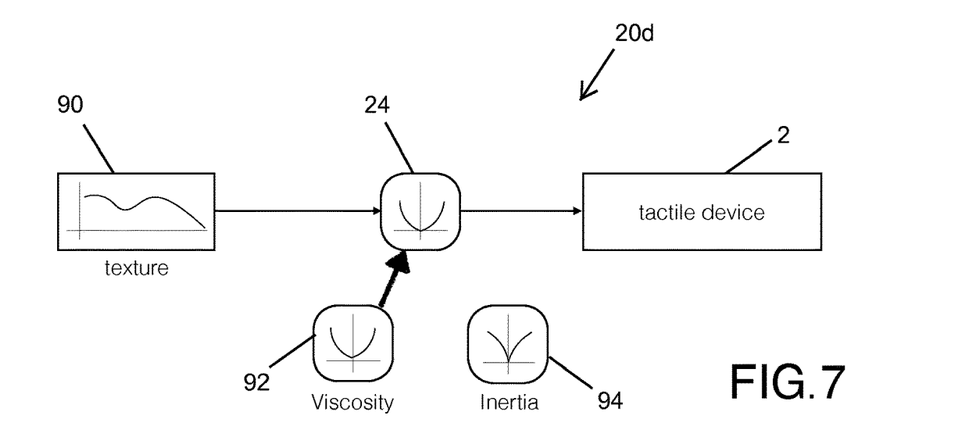
FIG. 7 is an example embodiment of a composing interface usable in performing an effects composition method, in which blocks of texture functions are arranged graphically to dictate a combination of texture functions to be composed.

"Effects" are alterations to standard textures that are intended to enhance the design space available to texture composers. In an example embodiment, a pre-designed texture is represented as a block 90 on the left-hand side of a graphical interface in the form of a designer interface 20d, as shown in FIG. 7. Effects may be shown as blocks in a toolbar, for example, wherein the toolbar includes exclusively, or among others, viscosity 92 and inertia 94. These effects blocks may be utilized as control points of the designer interface 20d, wherein the designer may select and slide the effects blocks into place along the diagram, as desired.

Figure 6:
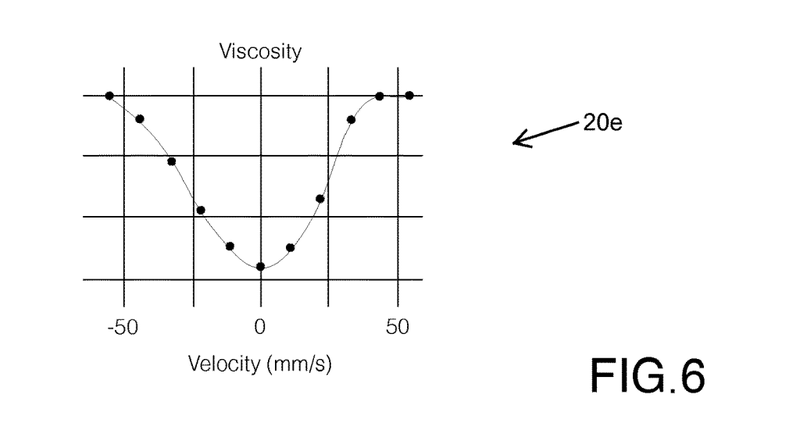
FIG. 6 is an example embodiment of a composing interface usable in performing an effect composition method, in which the texture function is represented as a function dependent on a state variable (in this case velocity of the finger)

In this example embodiment, the viscosity 92 effect is designed by placing control points on a graphical interface in the form of the designer interface 20e, such as is shown in FIG. 6. In the example shown in FIG. 7, the resulting viscosity block 92 in the effects panel of the designer interface 20d describes the previously created effect from FIG. 6, and it is added to the texture 24 by having the designer move the block 92 to become part of the diagram, to form a combined texture function.

Effects may include, but are not limited to, functions dependent on time, space, finger contact state, and other internal states. These effects may carry physically motivated names such as viscosity or inertia, or emotionally motivated names, such as happiness or warmth.

The effects panel of the designer interface 20d allows the user to add and create new and different effects to the same underlying texture. For example, the same virtual material (e.g., corduroy pants) could feel sticky in one spot, or more viscous in another spot, in order to convey different meaning about those areas. In the case of corduroy pants, an area with an oil stain could be rendered more viscous, or an area with a syrup spill could be rendered to feel stickier.

Figure 8A:
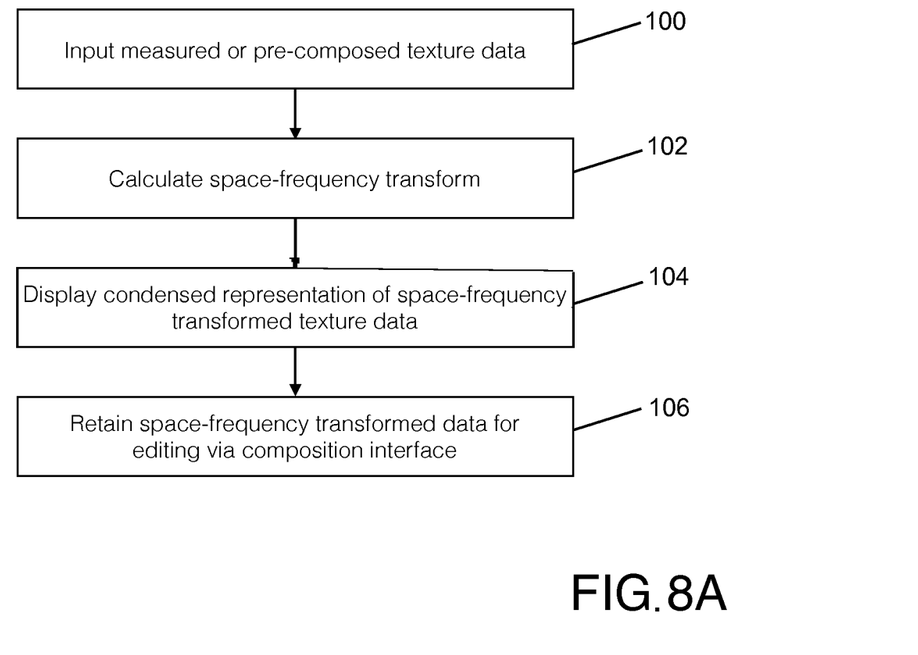
FIG. 8A is a flow diagram illustrating an algorithm for analyzing textures by use of a space-frequency transform for digital composition and editing.

Turning to FIG. 8A, an algorithm for analyzing textures by space-frequency analysis is shown. A space-frequency analysis divides the tactile surface into localized sections that are individually parameterized by a spectral magnitude or similar concept. This transformation of data shifts the mathematical representation of textures into a format that is more aligned with how they are perceived by a user, and therefore, offers a more intuitive approach to composition and editing. For instance, in a first step 100 an input is measured or pre-composed texture data is used. The next step 102 is to calculate a space-frequency transform. The next step 104 is to display a condensed representation of space-frequency transformed texture data. A further step 106 is used to retain space-frequency transformed data for editing via a composition interface.

Figure 8B:
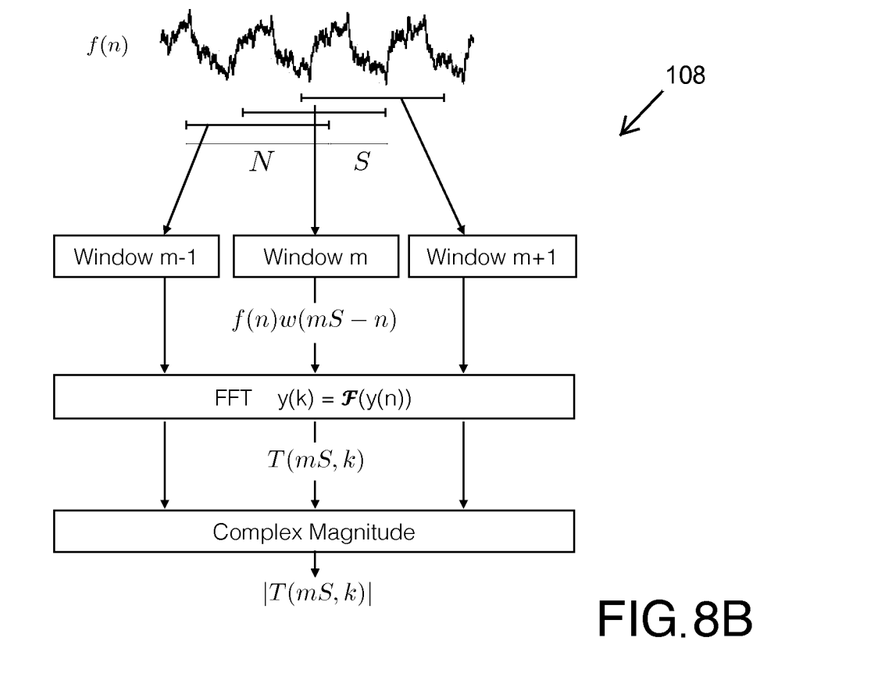
FIG. 8B is an example embodiment of a method to analyze a texture with space-frequency transform.

Shown in FIG. 8B is an example embodiment of a method 108 to analyze a texture with a space-frequency transform. Overlapping windows are created with a window function. In subsequent steps, the windows are analyzed with a Fast Fourier Transform (FFT) algorithm. The magnitude of the resulting analysis is stored for later editing and display. The resulting space-frequency transformed data is provided in equation 8, where mS is the location on the surface, and k is the wavelength of the texture signal. The Fourier transform is represented by F, and T(n) is the texture function in space, and w(n) is a window function with width N.

$$T(mS, k) = \frac{1}{N} \mathcal{F}\{T(n) \cdot w(mS - n)\} \quad (8)$$

Figure 9A:
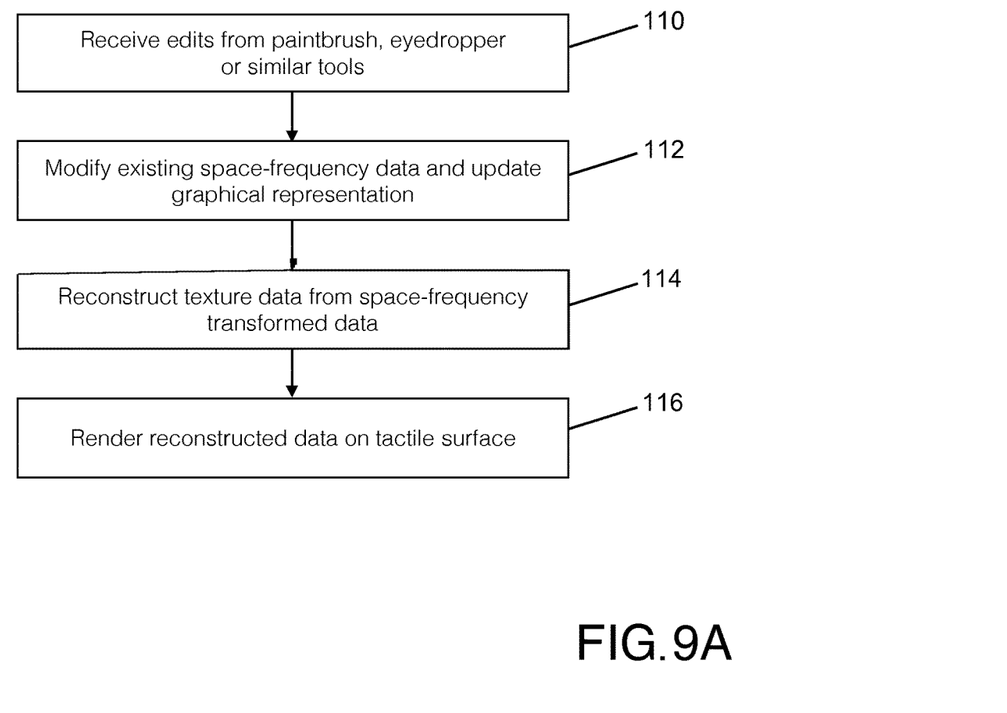
FIG. 9A is a flow diagram illustrating a method that uses space-frequency transformed representations of texture for editing and reconstruction, for rendering on a tactile surface.

Once the data is represented in the space-frequency domain, edits to the texture are performed via a composing interface. FIG. 9A outlines a method that uses space-frequency transformed representations of texture for editing and reconstruction, for rendering on a tactile surface. The method may be used for modifying and inverting the space-frequency transform to render textures on a tactile surface. In a first step 110, the designer interface receives edits from paintbrush, eyedropper or similar composition tools. The next step 112 is used to modify existing space-frequency data and to update a graphical representation. Modifying the space-frequency transform yields new texture data that must be reconstructed to a texture function for implementation in hardware. The following step 114 is used to reconstruct texture data from space-frequency transformed data. The reconstruction creates the texture function necessary for the actuators to display the newly created texture. This is followed by step 116 wherein the reconstructed data is rendered on a tactile surface.

Figure 9B:
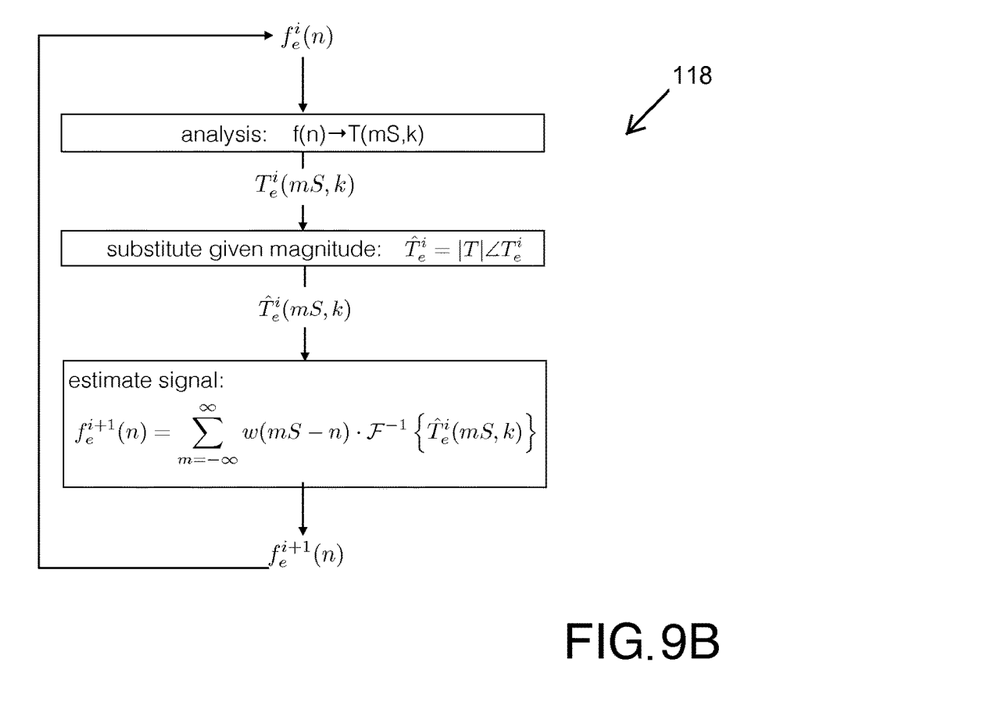
FIG. 9B is an example embodiment of a method to reconstruct a texture function from a space-frequency representation.

FIG. 9B shows a method 118 to reconstruct a texture function from a space-frequency representation. The reconstruction method or technique is an iterative algorithm that employs inverse FFT transformation and a least-squares method for generating a texture function whose space-frequency transformation closely matches the desired input.

The use of space-frequency transformations for analysis, storage, and synthesis of virtual texture is a novel method that offers significant advantage over the prior art. The space-frequency transform enhances a computer's ability to perform texture segmentation, by which different areas of the surface are characterized by their different feeling. It also facilitates localized composition, in which desired textures are edited on the surface in certain areas chosen through a composing interface. Additionally, because the space-frequency domain is more closely aligned with perception, it may serve as a first-step analysis for texture compression, an application that will be necessary as networked devices begin to implement programmable tactile surfaces.

Figure 10A:
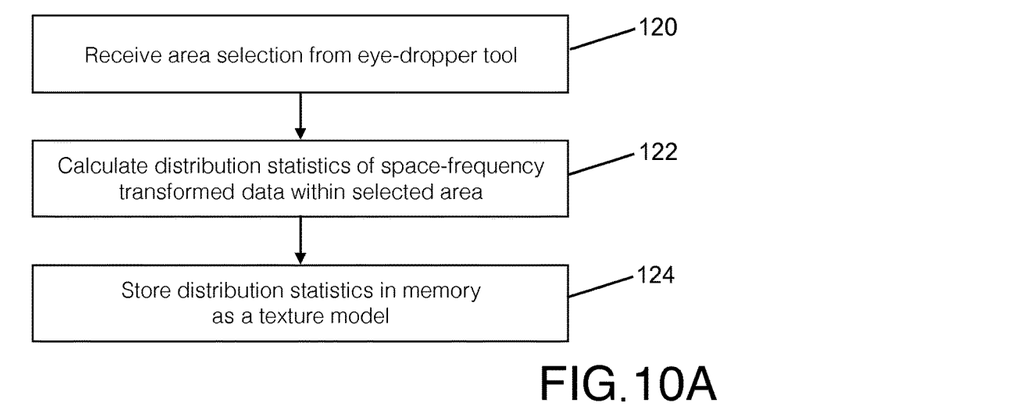
FIG. 10A is a flow diagram illustrating the steps of a method to implement an eyedropper tool for measuring the texture of a selected area of a surface.

Moving to FIGS. 10A-F, a series of methods for editing textures in the space-frequency domain are provided. FIG. 10A shows a method wherein an eyedropper tool measures statistics on an existing texture to create a model texture for later use in recreating textures. The eyedropper tool is selected in a user interface, and the designer selects an area of the texture to analyze and model. In the example embodiment, the model texture is a series of probability distributions for the space-frequency magnitudes at each wavelength k. In a first step 120, the interface receives the area selection from the eyedropper tool, and records all values within the selected area at each wavelength. The next step 122 is used to calculate statistical moments of the recording for storage, such as by calculating distribution statistics of space-frequency transformed data within the selected area at each wavelength. This is followed by a step 124 to store distribution statistics in memory as a texture model.

In another example embodiment, the model texture is a series of Rayleigh distributions with scale $\sigma_k^2$, and the eyedropper tool fits the recorded distribution via a maximum likelihood estimator given by equation 9.

$$\sigma_k^2 = \frac{1}{2N} \sum_{i=1}^{N} T(m_i S, k) \quad (9)$$

Figure 10B:
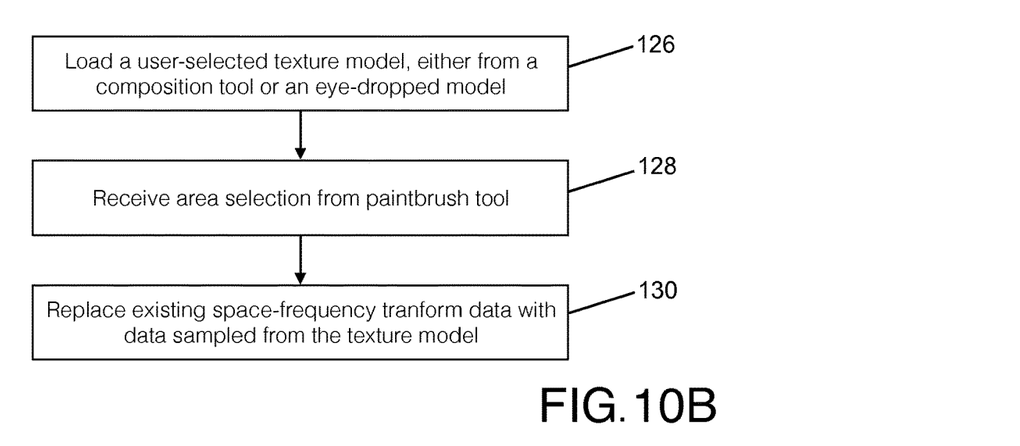
FIG. 10B is a flow diagram illustrating the steps of a method to implement a paintbrush tool for painting a composed or measured texture in selected areas of a surface.

Once a texture has been created, either by measuring with the eyedropper or composing from scratch, this texture should be applied to the surface. FIG. 10B illustrates the steps of a method for using a paintbrush tool to paint a previously created texture, whether composed or measured, into the space-frequency domain for selected areas of a surface. The paintbrush tool is selected in a user interface, and the designer draws strokes to paint the desired areas with the selected texture. In an example embodiment, in the first step 126, the space-frequency domain data is loaded or populated with data sampled from the probability distribution given by a model, or composed with a subtractive composition tool. In the next step 128, the interface receives an area selection from the paintbrush tool. This is followed by the step 130 of replacing existing space-frequency transform data with data sampled from the texture model. For instance, in another example embodiment, the data is populated with data sampled from a Rayleigh distribution as given in equation 10.

$$T(mS, k) = 1 - \exp\left(\frac{-(rand(0, 1))^2}{2\sigma_k^2}\right) \quad (10)$$

Figure 10C:
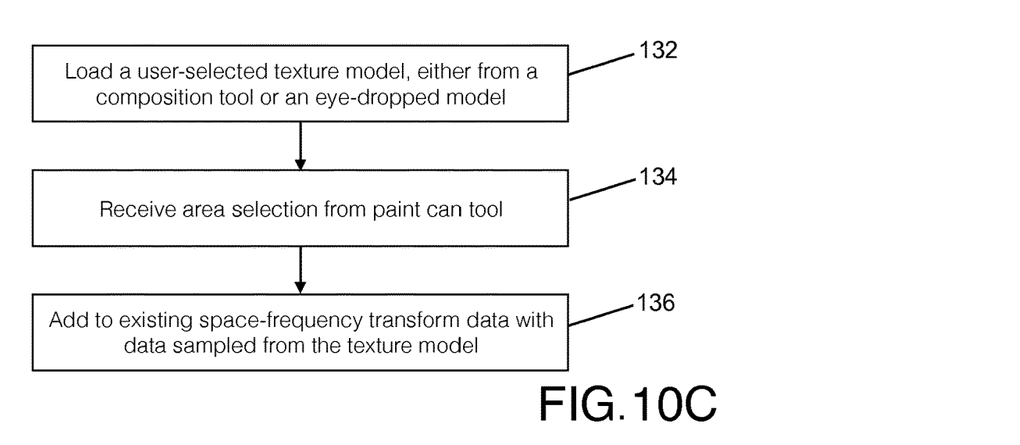
FIG. 10C is a flow diagram illustrating the steps of a method to implement a paint can tool for painting a composed or measured texture to selected areas of a surface.

FIG. 10C illustrates the steps of a method for using a paint can tool to fill an area in with new texture. The first step 132 includes loading a user-selected texture model, either from a composition tool or an eye-dropped model. In the next step 134, the interface receives an area selection from the paint can tool. This is followed by the step 136 of adding to existing space-frequency transform data with data sampled from the texture model. This method is mathematically identical to the paintbrush, but the area selection method is automatically determined by selecting an area that is one continuous selected region. In one example embodiment, these regions are determined by edges of lines that have been drawn in the graphical interface, and in another example embodiment, the regions are determined by uniform areas of texture in the space-frequency transform.

Figure 10D:
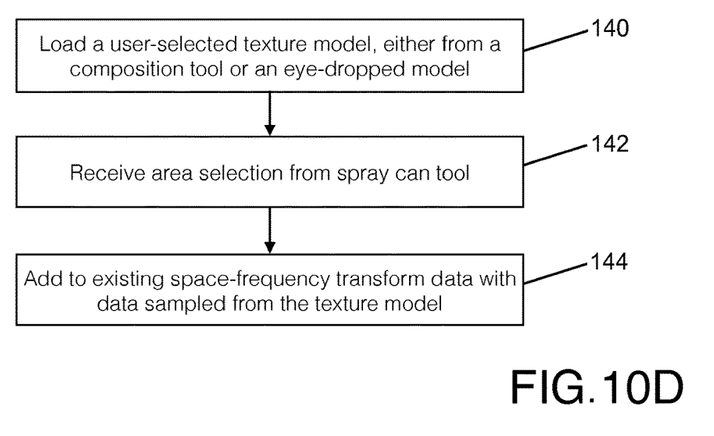
FIG. 10D is a flow diagram illustrating the steps of a method to implement a spray can for touching up an existing texture in selected areas of a surface.

Sometimes, however, a designer does not want to completely replace a texture that already exists on a surface. FIG. 10D illustrates the steps of a method for using a spray can tool to spray elements of a texture into the space-frequency domain. The spray can is similar to the paintbrush, but instead of replacing the data with newly sampled data, the new texture is added to the existing data. The first step 140 includes loading a user-selected texture model, either from a composition tool or an eye-dropped model. In the next step 142, the interface receives an area selection from the spray can tool. This is followed by the step 144 of adding to existing space-frequency transform data with data sampled from the texture model. An example embodiment is described by equation 11. The parameter a controls the rate at which the new texture is added, and is normally less than one. In a preferred embodiment, $\alpha=0.2$. Equation 11 may optionally be followed by a rescaling to maintain the overall average signal strength.

$$T(mS, k) = (1 - \alpha)T(mS, k) + \alpha\left(1 - \exp\left(\frac{-(rand(0, 1))^2}{2\sigma_k^2}\right)\right) \quad (11)$$

Figure 10E:
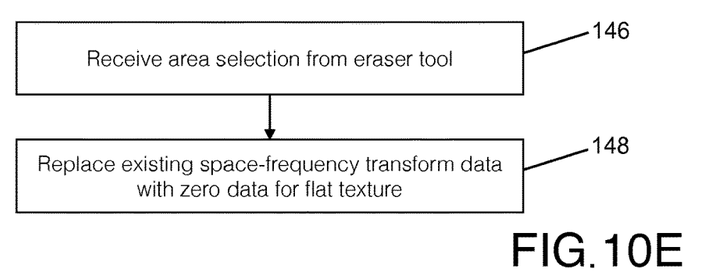
FIG. 10E is a flow diagram illustrating the steps of a method to implement an eraser tool for removing texture data from selected areas of a surface.

FIG. 10E illustrates the steps of a method for using an eraser tool to clear textures from the space-frequency domain. In the first step 146, the interface receives an area selection from an eraser tool. This is followed by the step 148 of replacing existing space-frequency transform data with data zero data for flat texture. Thus, in an example embodiment, the designer selects an area of the working texture using the eraser tool, and the computer sets all data to zero within the desired area. If a less aggressive approach is desired, the texture data may be reduced in amplitude by a factor dependent on the amount of time that the eraser tool is in motion above it.

Figure 10F:
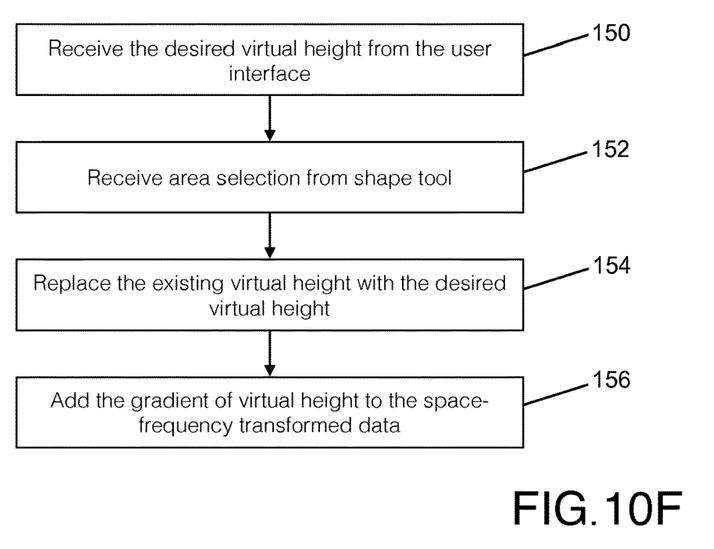
FIG. 10F is a flow diagram illustrating the steps of a method to implement a shape tool for editing the virtual shape of a textured surface.

FIG. 10F illustrates the steps of a method for using a virtual height tool to create the illusion of three-dimensional shape on the tactile device. In the first step 150, the interface receives the desired virtual height from the user interface. In the next step 152, the interface receives an area selection from a shape tool. This is followed by the step 154 of replacing existing virtual height with the desired virtual height. The next step 156 is to add the gradient of virtual height to the space-frequency transform data. In essence, in an example embodiment, the height tool is used to select an area of the texture and a virtual height to apply to it, then calculates the gradient of the height to add to the k=0 terms of the local area of the display, as described by equation 12.

$$T(mS,0) = \nabla h(mS) \tag{12}$$

Figure 11:
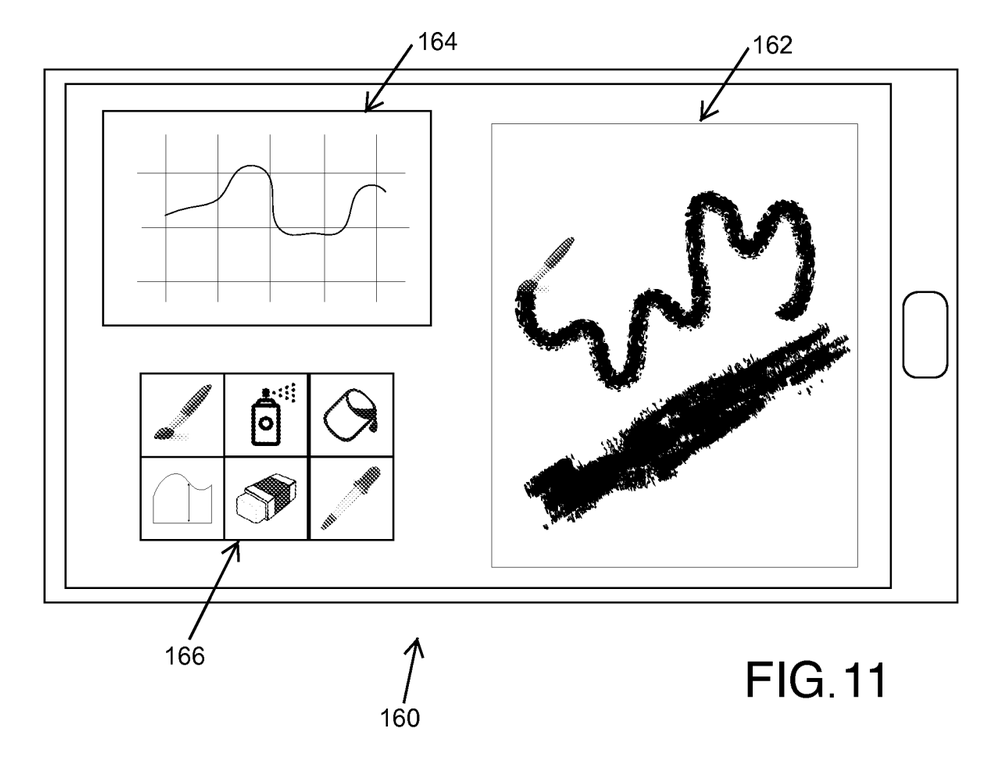
FIG. 11 is an example embodiment of a composing interface usable in performing edits to space-frequency transformed texture data, using tools such as a paintbrush, spray can and eraser.

FIG. 11 illustrates an example embodiment of a texture composition and editing tool 160. This example composing interface is usable in performing edits to space-frequency transformed texture data, using tools such as a paintbrush, spray can and eraser. In the example embodiment, a graphical representation 162 of the space-frequency transformed data is shown on the right-hand side of the interface. On the left-hand side, there are one or more composition tools, such as the additive or subtractive tools 164 from FIG. 3 or FIG. 4. Along with these composition tools is a suite of tools on said interface that modify the space-frequency domain data, such as editing tools 166, including for example a paintbrush, spray can, eraser and other suitable tools. The interface can be interacted with either by use of a mouse, pen (stylus), or by touch of an appendage, such as a finger, in which case live-friction rendering will provide instant feedback to the designer using the example interface.

It will be appreciated that the computational methods and graphical interfaces for use in digitally representing, designing and editing virtual textures in accordance with the present disclosure may be provided in various configurations. Any variety of suitable materials of construction, configurations, shapes and sizes for the graphical interfaces and tactile surfaces may be utilized to meet the particular needs and requirements of an end user. It will be apparent to those skilled in the art that various modifications can be made in the design and construction of such graphical interfaces without departing from the scope of the claimed subject matter, and that the claims are not limited to the preferred embodiments illustrated herein.

The invention claimed is:

1. A method for representing a tactile texture function and implementing a tactile texture on a tactile surface comprising the steps of:
configuring a spectral magnitude function representing the magnitude of lateral force at a set of wavelengths wherein the magnitude at each wavelength is associated with a certain probability distribution;
implementing an algorithm that computes a tactile texture function composed as the sum of a set of functions, wherein each function is the product of: a window function each having specific locations on a tactile surface and the spectral magnitude function drawn from the probability distribution; and
implementing on the tactile surface a lateral force defined by the computed texture function.

2. The method of claim 1, wherein a representation of the spectral magnitude function is graphically displayed as a frequency spectrum, further comprising:
a set of control points being movable in the y-axis to control the magnitude of the spectral magnitude function across a frequency spectrum; and
said algorithm operating to add, multiply or convolve the frequency spectrum specified by said control points with white noise to generate the spectral magnitude function.

3. The method of claim 2, wherein said frequency spectrum represents spatial or temporal frequency.

4. The method of claim 2, wherein said control points are movable with respect to frequency and magnitude.

5. The method of claim 2, wherein the algorithm multiplies said frequency spectrum by Gaussian noise having a Gaussian distribution or other similar noise signal.

6. The method of claim 1, wherein a representation of the spectral magnitude function is displayed as a series of fundamental periodic waves and their harmonics, further comprising:
said control points being movable to define a magnitude of each wave and harmonic; and
said algorithm operating to sum the waves and harmonics specified by said control points and generate the spectral magnitude function.

7. The method of claim 6, wherein said periodic waves and harmonics exist in a spatial domain or temporal domain.

8. The method of claim 1, wherein said representation of the spectral magnitude function is a combination of affective adjective pairs, further comprising:
said control points being associated with affective adjective pairs and each control point being movable as a slider acting to control the relative strength of one of the respective affective adjectives;
said algorithm using a collection of perception data to create spectral magnitude functions representative of each affective adjective; and
a further algorithm that adds, multiplies or convolves the spectral magnitude functions to create a combinatory spectral magnitude function.

9. The method of claim 1, wherein the windows function further comprises of control points consisting of blocks of texture functions that can be moved and connected to form a complex combined texture function.

10. The method of claim 9, wherein said blocks represent spectral magnitude functions created by the previously described methods.

11. A method for representing and implementing a tactile texture on a tactile surface comprising the steps of:
receiving a pre-composed texture data
configuring a spectral magnitude function of the pre-composed texture data representing the magnitude of lateral force at a set of wavelengths wherein the magnitude at each wavelength is associated with a certain probability distribution;
implementing an algorithm that computes a texture function composed as the sum of a set of functions, wherein each function is the product of: a window function each having specific locations on a touch surface and the spectral magnitude function drawn from the probability distribution; and
rendering to the tactile surface a lateral force defined by the computed texture function.

* * * * *